United States Patent [19]

Ledvina et al.

[11] Patent Number: 5,758,484

[45] Date of Patent: Jun. 2, 1998

[54] SILENT CHAIN WITH RAISED LINK BACKS

[75] Inventors: Timothy J. Ledvina, Groton; Philip J. Mott, Dryden, both of N.Y.

[73] Assignee: Borg-Warner Automotive, Inc., Sterling Heights, Mich.

[21] Appl. No.: 723,046

[22] Filed: Sep. 30, 1996

[51] Int. Cl.[6] ............................................. F16G 13/04
[52] U.S. Cl. ..................... 59/5; 59/8; 59/35.1; 474/206; 474/213
[58] Field of Search ................... 59/5, 6, 8, 35.1, 59/4; 474/206, 212, 213, 214, 155, 156, 157

[56] References Cited

U.S. PATENT DOCUMENTS

| | | |
|---|---|---|
| 2,525,561 | 10/1950 | Pierce . |
| 2,718,153 | 9/1955 | Dean . |
| 4,509,323 | 4/1985 | Ledvina et al. . |
| 4,509,937 | 4/1985 | Ledvina et al. . |
| 4,650,445 | 3/1987 | Mott . |
| 4,747,261 | 5/1988 | Frenker-Hackfort . |
| 4,832,668 | 5/1989 | Ledvina et al. . |
| 4,911,682 | 3/1990 | Ivey et al. . |
| 4,915,675 | 4/1990 | Avramidis . |
| 4,915,676 | 4/1990 | Komeya . |
| 5,154,674 | 10/1992 | Avramidis et al. . |
| 5,176,586 | 1/1993 | Sugimoto . |
| 5,199,197 | 4/1993 | Thuerman . |
| 5,345,753 | 9/1994 | Okuda et al. . |
| 5,470,282 | 11/1995 | Ledvina et al. . |
| 5,478,277 | 12/1995 | Kloefkorn . |

*Primary Examiner*—David Jones
*Attorney, Agent, or Firm*—Sidley & Austin; Greg Dziegielewski

[57] ABSTRACT

A silent chain for power transmission applications wherein the chain is in sliding contact with a chain guide or tensioner. The chain is constructed of some link plates having a higher back than other link plates. In operation, the higher backed links slide against the chain guide or tensioner while the lower backed links do not contact the chain guide or tensioner. Because not all of the links slide against the chain guide, the friction between the chain and chain guide is reduced.

14 Claims, 3 Drawing Sheets

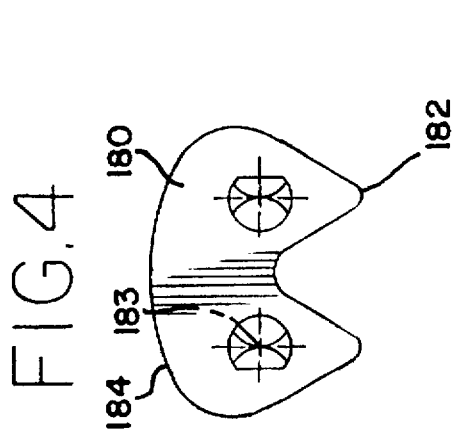
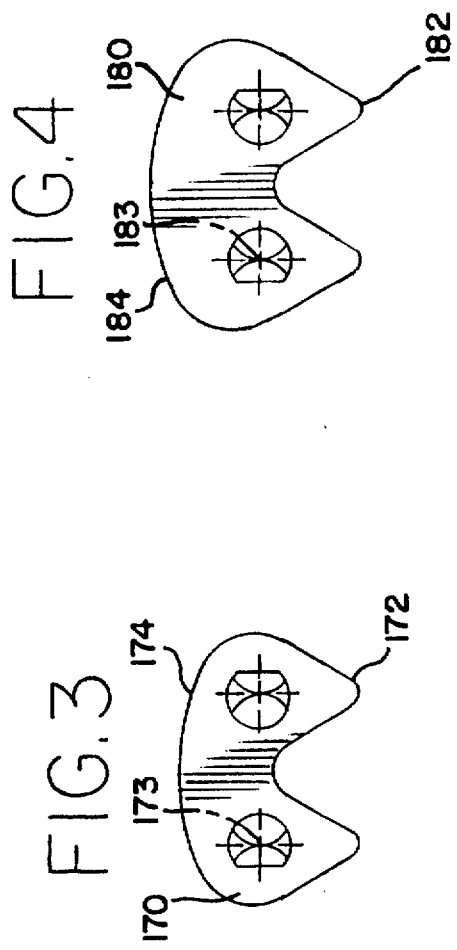
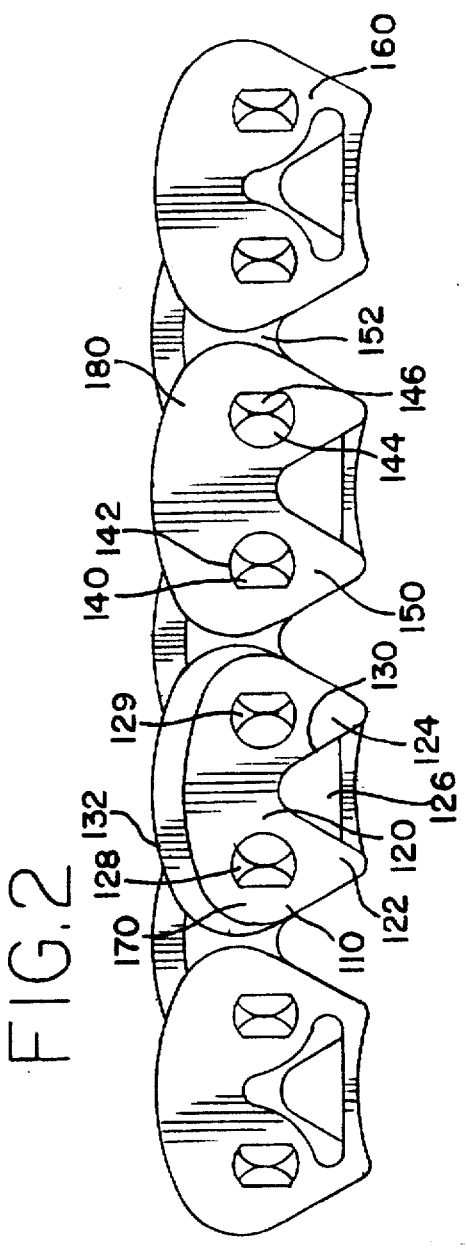
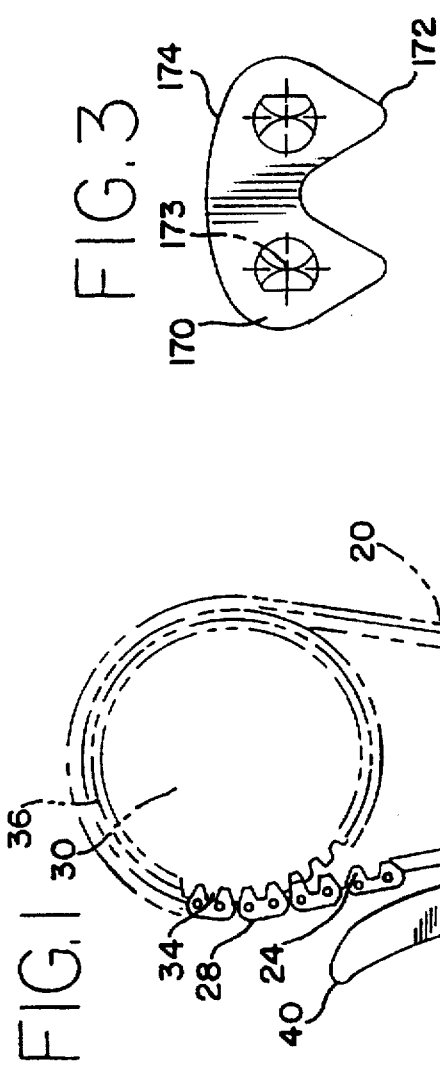

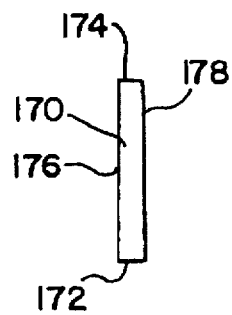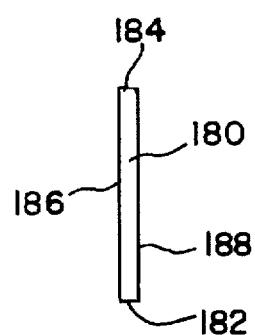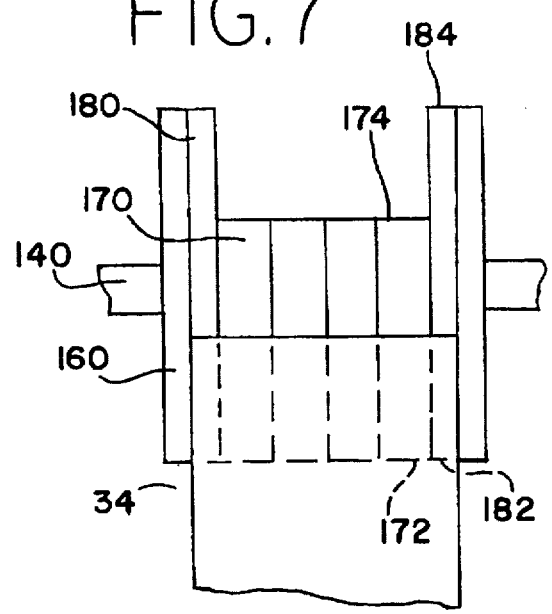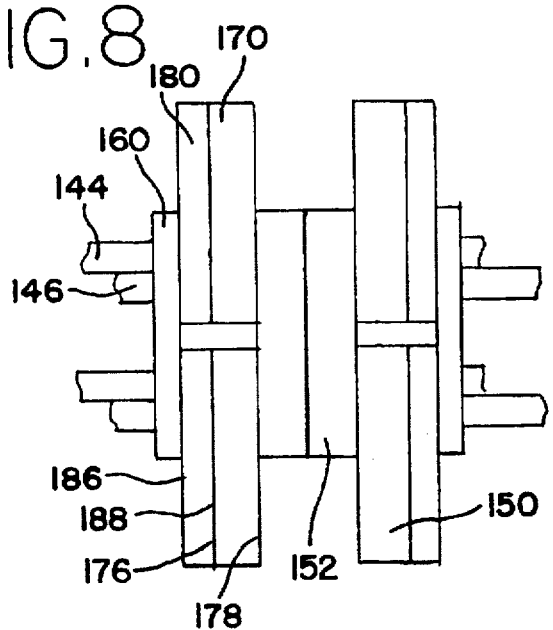

SILENT CHAIN WITH RAISED LINK BACKS

BACKGROUND OF THE INVENTION

The present invention relates to silent chain, or chain with links having inverted teeth. Such chains are utilized with sprockets in automotive transmissions, transfer cases, engine timing systems, and the like. More particularly, the present invention relates to a silent chain that contains some links where the backs of the links are raised above those of other links in the chain. The result is that the chain has a reduced area of contact between the chain links and a flat tensioner arm or chain guide that contacts the back of the chain. This reduced area of contact leads to a chain that contacts the guide with lower friction, less noise, and other advantages of manufacturing and assembly.

Silent chains are formed by an arrangement of link plates in lateral and longitudinal directions. The links are interlaced and joined by pins. A typical chain is composed of inner links, which contact the teeth of a sprocket to provide power transmission, and guide links, which do not provide power transmission. Guide links are employed to maintain the chain on the center of the sprocket when the chain is wound around the sprocket. A row of link plates, arranged in the lateral direction, typically has a number of inner links combined with guide links in the center or at both edges of the row.

Chain link plates each have an inner edge for contacting a sprocket when wrapped therearound and an outer edge opposite to the inner edge. For purposes of this application, the words "inner" and "outer" will refer respectively to the inner and outer sides of the chain loop. The inner surface is divided into two teeth, or toes, which are connected at the crotch and which provide driving contact with the sprocket teeth. The outer surface typically comprises a flat or lightly rounded surface which does not contact the sprockets but typically contacts a chain guide or a chain tensioner during the portion of the time that the chain is between the two sprockets.

Chain guides and tensioners are employed to regulate the chain tension and position as it traverses between the two sprockets. In a power transmission system, the chain transmits power between a driving sprocket and a driven sprocket. In between the two sprockets, one portion of the chain remains generally tight and the other remains generally slack. The chain experiences various oscillations and vibrations in tension resulting from a number of possible factors. In an internal combustion engine, for instance, fluctuations in chain tension may result from thermal expansion of system components, camshaft and crankshaft induced torsional vibrations, or reverse rotation of the engine occurring, for example, during engine start up or stoppage. Typically, a chain guide is deployed on the tight portion of the chain and a chain tensioner, which pushes against the chain to maintain tension, is deployed on the slack side. These devices maintain a certain degree of tension in the chain to prevent noise, slippage, or the unmeshing of chain and sprocket teeth.

For purposes of this application, the term "chain guide" will refer to any device contacting the outer surface of the chain during operation of the chain system, including either a chain guide snubber or the arm of a chain tensioner in a power transmission system.

Silent chains face a number of design problems. One problem is the friction between the chain and the chain guide. A conventional silent chain contains more links per row than a single or double strand roller chain, which may have only two links per row. As a result, a silent chain has more surface area in contact with the chain guide. Because friction between two surfaces is a function of, among other things, the area in contact between the two surfaces, the increased contact area of silent chains results in increased friction between the chain and the chain guide. Increased friction is undesirable because it results in increased noise, expended energy, and wear on the components.

The present invention addresses the problem of reducing the friction in a silent chain drive by employing some link plates with a higher back than others. These higher back plates contact the chain guide, but the lower back plates do not. As a result, friction is only generated between the chain guide and the higher back plates, and friction losses are reduced.

A chain design employing the general concept of chain links with different back shapes, but in a different context, is disclosed in Dean, U.S. Pat. No. 2,718,153. Dean discloses a drive mechanism comprising a chain wrapped around two sprockets. As the chain circles the sprockets, the backs of the chain links slide against housing plates, as shown in FIG. 9. The housing plates act as guides to hold the chain on the sprockets. In order to maintain the chain within the housing plates, the backs of the chain link plates have the same radius of curvature as a retainer plate. However, because one sprocket is larger than the other, Dean's chain utilizes one size of link plate shaped to match the larger sprocket and a smaller size of link plate shaped to match the smaller sprocket. The retainer plate on the smaller sprocket has channels for the larger link plates to traverse without making contact, allowing only the smaller link plates to contact the smaller retainer plate, as shown in FIG. 10.

The Dean device does not teach or suggest the use of a guide or tensioner between the sprockets. In Dean, the retainer plate is part of the overall housing and is not used with a chain guide or tensioner. As shown in FIG. 9, as the chain travels around the smaller sprocket, the smaller links contact the retaining plate while the larger links ride in channels in the retaining plate. The chain is held in roughly the proper position by the sprocket. However, a lateral displacement of as little as one or two link plate widths would cause the larger link plates to skip or jump the sides of the channels, leading to disruption of smooth operation. Such lateral displacement is more likely to occur on the portion of the chain that is suspended between the sprockets, where a chain guide would be deployed, compared to the portion of the chain engaged with the sprockets, as in Dean.

Other prior art devices have been made with special wear-resistant links intermingled with other non-wear resistant links. The device disclosed in Frenker-Hackfort, U.S. Pat. No. 4,747,261, employs plastic link plates mixed with steel load bearing plates. These plastic plates have projections which extend outward from the chain to prevent contact between the chain and, for instance, a piston rod of a fork lift. Other conventional devices employ outside guide links with a lower back than the inside links, so that only the inside links contact the chain guide. Still other chain designs involve guide links non-symmetrical in the longitudinal direction, so that the non-symmetrical guide links can be used to increase the contact area between the chain and the guide if wear on the guide face becomes unacceptable.

A better silent chain design is one that reduces the contact area between the chain and the chain guides, while providing for equal load distribution across the link rows. Accordingly, the present invention relates to a silent chain having some links with a raised back, thus reducing the area of contact between the chain and the guide. The lower back links have a greater thickness than the higher backed links. This difference in heights gives the lower backed links increased stiffness, such that although the higher backed link plates have a greater height, the stiffness of the lower backed link plates is roughly equivalent to the stiffness of the higher backed link plates, providing for equal deformation and load distribution across the rows of links. This equal deformation reduces the risk of shearing or bending of the pins.

Another device for reducing friction in a silent chain drive is to construct the chain of links having smoother edges. Conventional links are stamped, producing a rough edge on the link resulting in friction between outer link surface and the chain guide. This friction could be reduced by using fine blanking, special blanking, or special tumbling to smooth the edges of the link. Unfortunately, the cost of such blanking or tumbling makes this option unattractive to chain manufacturers.

The present invention provides for a chain having smooth edges at a lower cost than conventional chains. In the device of the present invention, only the raised backed links contact the chain guide, while the lower backed links do not contact the chain guide. Therefore, only the raised back links need be given the more costly smooth outer edge. Because only some links have a smooth edge, a chain can be constructed at reasonable cost wherein all the links in contact with the chain guide have a smooth edge.

In addition, the chain of the present invention provides for ease of assembly. One problem in assembling conventional silent chains having different types of links is the difficulty of distinguishing the different types of links when assembling the links onto the pins. In the present invention, the lower backed links, with lower height and greater thickness, are easily distinguishable from the higher backed links. Thus, a means is made available to separate the links in production, reducing the risk of misassembly.

Accordingly, it is an object of the present invention to provide a silent chain with reduced friction between the chain and a chain guide. Another object of the present invention is to provide a silent chain having increased strength and durability resulting from even load distribution across the rows of link plates. It is another object of the invention to provide a silent chain having advantages in cost and having ease of manufacturing and assembly.

SUMMARY OF THE INVENTION

The present invention relates to a chain drive having a chain in sliding contact with a chain guide. In particular, the present invention has application in a power transmission system, where an endless chain is wound between two sprockets, and a chain guide or tensioner is in sliding contact with the chain.

The present invention is directed to a silent chain designed to minimize friction between the chain and chain guide. The chain is comprised of rows of link plates, interleaved and connected by pins. Within each row, some of the link plates have a higher back than others. These higher back link plates are in sliding contact with the chain guide, while the lower backed link plates do not contact the chain guide. Because not all the link plates contact the chain guide, the chain has less surface area in contact with the chain guide, and thus there is less friction between the chain and the chain guide. This reduced friction leads to less noise and wear on the chain and chain guide than a conventional chain in which all of the links contact the guide.

One embodiment of the present invention is a chain whose design addresses the load distribution across the rows of links. The lower backed link plates have a greater thickness than the higher backed link plates. This greater thickness gives the lower backed link plates stiffness comparable to that of the higher backed link plates, even though the higher backed link plates have a greater height. Having roughly uniform stiffness across the links in a row gives the chain greater durability, because the pin is not subject to bending or shearing resulting from unequal deformation among the link plates. Thus, the difference in thicknesses allows link plates having differing heights to be assembled on the same row without leading to a weaker chain.

In another embodiment, a process such as fine blanking, special blanking, or special tumbling can be used to produce raised back link plates having a smoother outer edge than the lower backed plates. Although processes such as fine blanking or special tumbling are more expensive than conventional stamping with conventional tumbling, the increase in cost is offset because fewer link plates are in contact with the chain guide, so that fewer link plates require the smoother edge. This smoother outer edge results in reduced friction between the link plates and the chain guide.

In assembly, each row of link plates is constructed from a mixture of lower backed link plates and higher backed link plates. Because the lower backed link plates and the higher backed link plates differ in both height and thickness, the assembler can distinguish the two types of link plates easily, reducing the risk of misassembly.

For a better understanding of these and other aspects and objects of the invention, reference should be made to the following detailed description taken in conjunction with the accompanying drawings.

BRIEF DESCRIPTION OF THE DRAWINGS

FIG. 1 is a side view of a silent chain operating in a power transmission system.

FIG. 2 is a side view of one embodiment of the present invention.

FIG. 3 is a side view of one embodiment of the present invention, a lower backed inner link.

FIG. 4 is a side view of one embodiment of the present invention, a higher backed inner link.

FIG. 5 is an end view of the inner link shown in FIG. 3, a lower backed link.

FIG. 6 is an end view of the inner link shown in FIG. 4, a higher backed link.

FIG. 7, which is not to scale, is an end view of one embodiment of the present invention, including both higher backed links and lower backed links.

FIG. 8, which is not to scale, is a top plan view of three rows of links of the present invention.

DETAILED DESCRIPTION OF THE PREFERRED EMBODIMENTS

Figure 9:
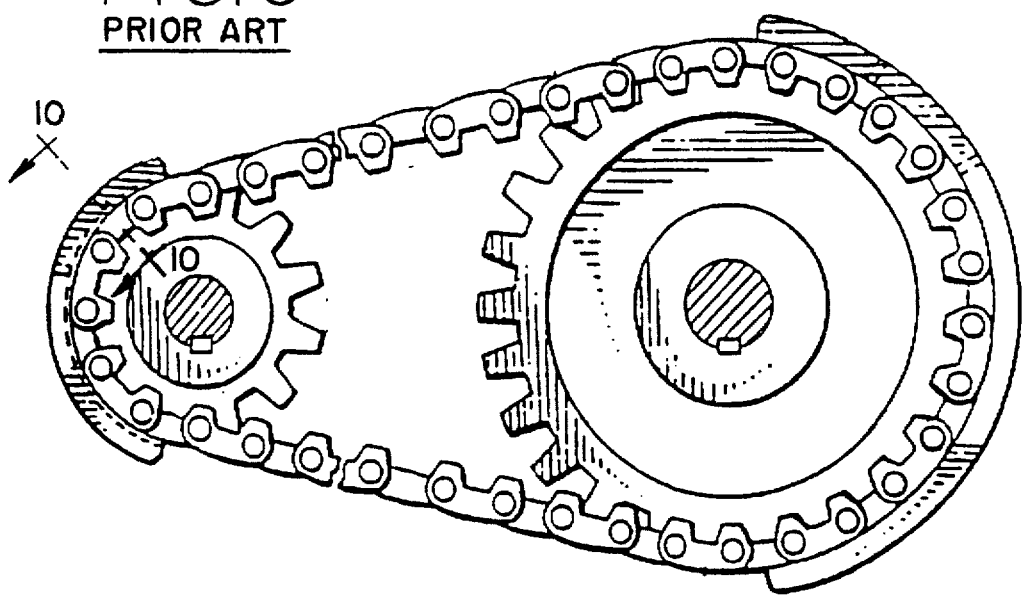
FIG. 9 is a side view of a prior art silent chain.
Figure 10:
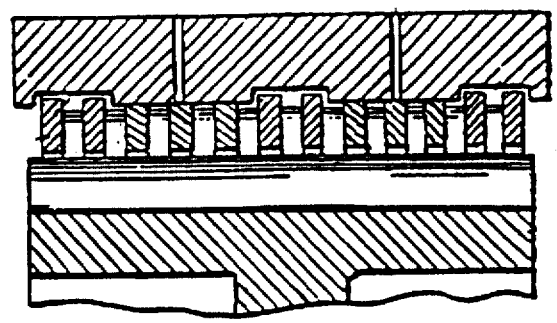
FIG. 10 is an cross sectional view of the prior art silent chain illustrated in FIG. 9 taken along line 10—10 of FIG. 9.

The present invention is directed to providing a silent chain which slides against a chain guide or tensioner. The chain is constructed from a combination of links having a lower back height and links having a higher back height. The higher backed links slide against the chain guide while the lower backed links do not contact the chain guide. As a result, the area of contact between the chain and the chain guide is less than for conventional chains, wherein every link slides against the chain. This reduced area of contact results in less friction between the chain and chain guide.

Turning now to the drawings, FIG. 1 illustrates one embodiment of the present invention, an endless chain 20 wrapped around two sprockets 30, 32, with a chain tensioner 40 in contact with a portion of the chain 22 that is suspended between the sprockets. The sprockets have teeth 34 uniformly spaced around the sprockets' outer circumference 36. These sprocket teeth engage inverted teeth 24 formed by the links 28 of the chain 20.

FIG. 2 is a side view of one embodiment of the present invention. Each link plate 110 comprises a body 120 having two apertures 128, 129, and two teeth 122, 124, forming a crotch 126. Taken together, the surfaces of the two teeth form the inner surface 130 of the link, while the outer surface 132 is opposite to the inner surface. The inner surface faces the sprocket teeth 34 while the outer surface faces the chain guide 40.

The links are interleaved in lateral and longitudinal dimensions, and connected by pins 140 inserted through the pin apertures 142. In some embodiments, the pins are rocker pins 144, 146. Interleaving is achieved by fixing a rocker pin 144 through a lateral row 150 of link plates, and a second adjacent rocker pin 146 through a successive row 152 of link plates, thus providing for rolling motion of the rocker joint. In this example of the present invention, a rocker pin is shown as a joining pin. However, a round pin and associated round aperture could also be used for the purpose of the present invention.

In some embodiments, guide link plates 160, as shown in FIG. 2, are installed in a lateral row of links and both ends of rocker pins 144, 146 are press fit and fixed in the guide link plates. In some embodiments, the guide link profile and thickness are also designed to provide for uniform load distribution across the lateral row of link plates.

The non-guide link plates are a mixture of lower backed link plates 170 and higher backed link plates 180. In some embodiments, the guide link plates may also be higher backed link plates or a mixture of higher and lower backed link plates. FIG. 3 is a side view of a lower backed link plate in one embodiment of the present invention. FIG. 4 is a side view of a higher backed link plate in one embodiment of the present invention. FIGS. 5 and 6 illustrate end views of one embodiment of the present invention, showing individual links. FIG. 7 is an end view of one embodiment of the present invention, showing a row of links engaging a sprocket tooth. FIG. 8 is a top plan view of the chain of FIG. 7, showing interleaved rows of links connected by pins.

The higher backed links 180 have a height, measured from inner surface 182 to outer surface 184 and a thickness, measured from the first face 186 to the second face 188. The lower backed links also have a height, measured from the inner surface 172 to the outer surface 174, and a thickness, measured from the first face 176 to the second face 178. The heights of the links can also be measured from the centerpoints 173, 183 of the apertures to the outer surfaces 174, 184. The back height of the higher backed links is greater than the back height of the lower backed links. This difference in heights is in contrast with a conventional chain, wherein all the links have uniform height.

In operation, this difference in heights allows the higher backed links to slide against the chain guide, while the lower backed links do not slide against the chain guide. As a result, present invention has fewer link backs in contact with the chain guide than a conventional silent chain having the same number of links per row. Thus, the area of contact between the chain and the chain guide is less for the chain of the present invention than for a conventional silent chain. Because the amount of friction between two surfaces depends, among other things, on the amount of surface contact between the two surfaces, the chain of the present invention generates less friction against the chain guide than a conventional chain.

Each of the link plates also has a thickness, measured between the two faces of the link plate. In some embodiments, the thicknesses of the higher and lower backed links are adjusted to equalize the load distribution across the rows of links. The greater height of the higher backed links tends to make the higher linked backs more resistant to deformation than the lower backed links. To compensate, the thickness of the lower backed links is calculated so that the lower backed links and the higher backed links have roughly equivalent resistance to deformation. As a result, loads applied to the chain are absorbed uniformly across the rows of links, and undesirable bending moments on the pins are reduced.

Each link plate has an outer surface 132 which faces the chain guide. In some embodiments, the outer surface of the higher backed link plates is a smooth surface, such as can be produced by fine blanking or tumbling. In particular, this outer surface may be smoother than the surface usually found on stamped link plates. The smoother outer surface leads to less friction and wear on both the link plates and the chain guide.

The outer surface of the lower backed link plates is not as smooth as the outer surface of the higher backed link plates. A smooth outer surface is not required for the lower backed link plates because the lower backed link plates do not slide against the chain guide. As a result, the lower backed link plates can be made by conventional stamping methods, thus reducing cost.

During assembly, the differing shapes of the higher and lower backed link plates allow for ease of assembly. Because the higher backed link plates have a greater height and a smaller thickness than the lower backed link plates, the higher backed plates are easily distinguishable from the lower backed plates. Thus, the risk of misassembly is reduced.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description Consequently, while the invention has been described with reference to particular embodiments, modifications of structure, sequence, materials and the like would be apparent to those skilled in the art, yet still fall within the scope of the invention.

What is claimed is:

1. A silent chain comprising:

a plurality of interlaced link plates;

said link plates each having an inner edge, an outer edge, and first and second faces between said inner edge and said outer edge;

said link plates each having a pair of apertures, said link plates being interleaved and interconnected by pins inserted in said apertures;

said link plates each having a pair of teeth extending away from said outer edge;

said link plates comprising a first number of link plates having a first profile and a second number of link plates having a second profile;

at least one row of said chain including at least one said link plate having said first profile and at least one said link plate having said second profile;

said first profile defining a first height between a horizontal line connecting the centerpoints of said apertures and the highest point on said outer edge;

said second profile defining a second height between a horizontal line connecting the centerpoints of said apertures and the highest point on said outer edge;

said first height being greater than said second height.

2. The silent chain of claim 1 said first profile further comprising a first thickness between said first face and said second face;

said second profile further comprising a second thickness between said first face and said second face;

said first thickness being different than said second thickness.

3. The silent chain of claim 1, wherein said link plates further comprise a plurality of guide link plates;

said guide link plates each having an inner edge, an outer edge, and two faces between said inner edge and said outer edge.

4. The silent chain of claim 3, wherein said guide link plates are positioned on the outside of rows of interleaved links.

5. The silent chain of claim 3, wherein the apertures of said guide link plates are press fit on said pins.

6. The silent chain of claim 1, wherein said link plates having said first profile have at least one smooth edge.

7. The silent chain of claim 1, wherein said pins are rocker pins.

8. The silent chain of claim 1, wherein said links having said first profile have the same elasticity as said links having said second profile.

9. A chain drive system comprising;

a pair of sprockets having circumferentially arranged sprocket teeth;

an endless chain wound around said sprockets, said chain engaging said sprocket teeth;

a chain guide positioned along the outside of said chain;

said chain including a plurality of interlaced link plates each having an inner and an outer edge and a pair of teeth at said inner edge for contacting said sprocket teeth;

a first plurality of said link plates arranged to slidingly contact said chain guide along said outer edges;

a second plurality of said link plates having said outer edges spaced apart from said chain guide.

10. The chain drive system of claim 9, said first plurality of link plates having a first thickness, said second plurality of link plates having a second thickness, and said first thickness being different from said second thickness.

11. The chain drive system of claim 9, said first plurality of link plates having a first height, said second plurality of link plates having a second height, and said first height being different from said second height.

12. The chain drive system of claim 9, said link plates arranged in rows, and at least one row of said chain including at least one said link plate of said first plurality of link plates and at least one said link plate of said second plurality of link plates.

13. A method of manufacture of a silent chain, said chain including a plurality of link plates having a first height and a first thickness, and a plurality of link plates having a second height and a second thickness, said link plates each having a pair of teeth and a pair of apertures, said method comprising:

forming rows of link plates along parallel pins, said rows including link plates having said first height and said first thickness and link plates having said second height and said second thickness, interleaving said rows of link plates to form an endless chain.

14. The method of claim 13 wherein said link plates having said first height and said first thickness have an outer edge, said outer edge being a smooth edge, produced by blanking.

* * * * *

UNITED STATES PATENT AND TRADEMARK OFFICE
CERTIFICATE OF CORRRECTION

PATENT NO. : 5,758,484
DATED : June 2, 1998
INVENTOR(S) : Ledvina, et al It is certified that error appears in the above-identified patent and that said Letters Patent is hereby corrected as shown below:

On the title page, under item [56], insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 3 | 6 | 5 | 6 | 3 | 6 | 1 | 04/18/72 | Honda | | | |
| | | 5 | 1 | 7 | 6 | 5 | 8 | 5 | 01/05/93 | Novak | | | |
| | | | | | | | | | | | | | |

Signed and Sealed this

Second Day of March, 1999

Attest:

Q. TODD DICKINSON

*Attesting Officer*     Acting Commissioner of Patents and Trademarks